United States Patent [19]

Rennick et al.

[11] 3,813,931
[45] June 4, 1974

[54] APPARATUS FOR PRECISELY INDICATING POSITION OF ROTATIONAL MACHINERY

[75] Inventors: Lyle V. Rennick, Mission Viejo; William L. Mitchael, Fullerton, both of Calif.

[73] Assignee: Northrop Corporation, Los Angeles, Calif.

[22] Filed: Mar. 15, 1973

[21] Appl. No.: 341,703

[52] U.S. Cl. .................................. 73/116, 324/16 T
[51] Int. Cl. ........................................... G01m 15/00
[58] Field of Search.......... 73/116, 117.3; 324/16 T; 356/23; 315/149; 307/266

[56] References Cited
UNITED STATES PATENTS

| | | | |
|---|---|---|---|
| 2,485,888 | 10/1949 | Jordan | 356/23 |
| 2,785,215 | 3/1957 | Yetter | 324/16 T |
| 3,314,407 | 4/1967 | Schneider | 324/16 T |
| 3,597,677 | 8/1971 | MacCrea | 324/16 T |

*Primary Examiner*—Jerry W. Myracle
*Attorney, Agent, or Firm*—Edward A. Sokolski

[57] ABSTRACT

A rotating portion such as a drive shaft of a machine has a marker placed thereon to indicate a predetermined portion of the rotation cycle. A signal from this marker is sensed by a sensor each time the machinery passes through this portion of the rotation cycle. A ramp generator develops a ramp signal in response to the output of the sensor. The peak of the ramp signal is detected and this peak signal fed to a calibration potentiometer by means of which a percentage of the peak signal can be selected. The output of the potentiometer and that of the ramp generator are fed to a voltage comparator which triggers a pulse generator when the ramp reaches the voltage set on the potentiometer. The output of the pulse generator actuates a strobe light which is used to detect a marker on the machinery indicative of a precise rotational position, the potentiometer being adjusted until the strobe light is precisely synchronized with this marker. Thus a calibration is achieved whereby the output pulse precisely indicates a predetermined rotational position of the machinery. This output pulse can then be used with other measurement circuitry, without further requirement of the strobe light.

5 Claims, 3 Drawing Figures

APPARATUS FOR PRECISELY INDICATING POSITION OF ROTATIONAL MACHINERY

This invention relates to analysis of the operation of rotational machinery, and more particularly to an apparatus and technique for generating a pulse precisely indicative of a predetermined rotational position of a machine such as an engine.

In the analysis of the operation of rotational machinery such as internal combustion engines, it is generally necessary to provide a marker signal precisely indicative of a predetermined rotational position at or near the top dead center position of the Number 1 cylinder. Prior art devices for achieving this end result generally involve either an optical or magnetic marker placed on the engine flywheel or crank shaft which operates in conjunction with an appropriate detector which provides a pulse output each time the marker arrives thereopposite. It is difficult with this type of detection system to obtain an output pulse which is precisely calibrated to indicate the rotational position of interest (i.e., of the order of 1° accuracy). This is in view of the difficulty of obtaining a marker and detector which have such a narrow detection range and which can be maintained within such a close range after a period of use, and also in view of the relative inaccessibility of the flywheel for sensor installation purposes. On the other hand, it is relatively easy to obtain a very precise reading of a rotational position by utilizing a strobe light in conjunction with line markers on the engine flywheel and housing.

This invention overcomes the aforementioned shortcomings of prior art pulse generating systems by providing means for utilizing the strobe light flywheel marker measurement for accurately calibrating the generation of an output pulse with a marker and detector so that it has an accuracy commensurate with that provided in a strobe light measurement.

It is therefore an object of this invention to improve the accuracy of the analysis of rotating machinery.

It is a further object of this invention to provide means for generating a pulse more accurately indicative of a predetermined point in an engine rotation cycle.

Other objects of this invention will become apparent as the description proceeds in connection with the accompanying drawings, of which:

Briefly described, the invention is as follows: A marker is placed on a rotating member of a piece of machinery such as an engine, to indicate a predetermined positional range in the rotational cycle of such machinery. A detector is used to generate a pulse indicative of this rotational position range with the rotation of the machinery. The pulse signal is appropriately shaped and a ramp signal generated therefrom. The peak of this ramp signal is detected and held and this peak signal fed to a potentiometer. The arm of the potentiometer and the ramp signal are fed to a voltage comparator, the signal at the arm of the potentiometer representing a percentage of the peak of the ramp signal. The voltage comparator provides a signal when the ramp voltage reaches the percentage of its peak set on the potentiometer, this signal being used to drive a pulse generator to provide an output synchronization pulse. This output pulse is utilized to drive a strobe light which is placed opposite marker indicia on the engine flywheel which precisely indicates the rotational position of interest. The potentiometer is then adjusted until the strobe is precisely synchronized with the marker indicating the predetermined rotational position of interest. Under such conditions the output pulse has an accuracy commensurate with that of the strobe-marker measurement.

Figure 1:
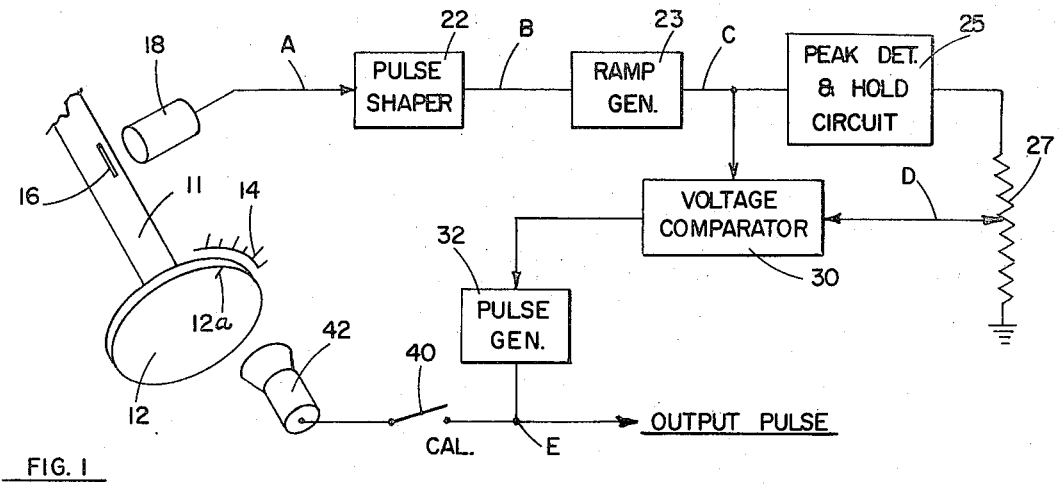
FIG. 1 is a functional block diagram of a preferred embodiment of the invention.
Figure 2:
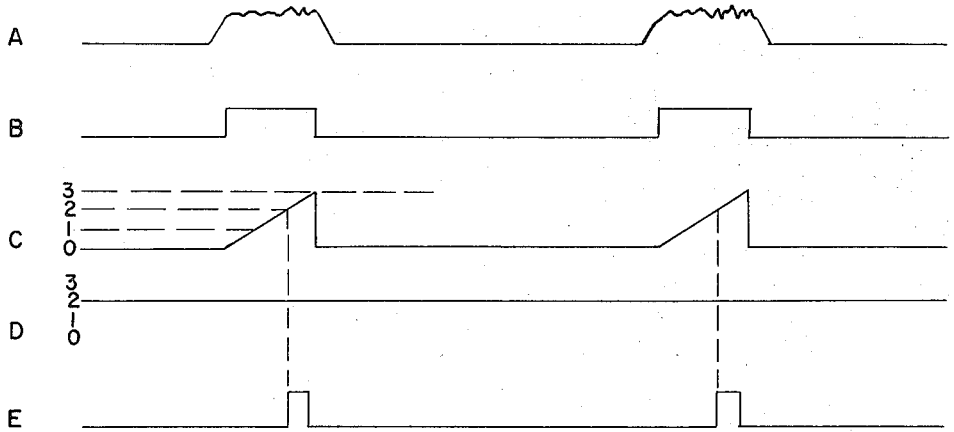
FIG. 2 is a series of wave forms illustrating the operation of a preferred embodiment.

Referring now to FIGS. 1 and 2, a preferred embodiment of the invention and waveforms generated thereby are respectively illustrated. Engine crank shaft 11 has a flywheel 12 attached thereto, this flywheel having a line marker 12a thereon which in conjunction with marker lines 14 on the engine housing indicates positions in the engine's rotation cycle at or near top dead center. Attached to shaft 11 is a reflecting strip 16 which may be in the form of a narrow strip of reflecting tape. Positioned opposite reflecting strip 16 is a photo sensor 18 which may comprise a photosensitive cell which generates an output pulse in response to predetermined light input thereto. Strip 16 and photodetector 18 are positioned relative to each other such that the strip will arrive opposite the input receptor of photo detector 18 at a time in the rotational cycle which corresponds to the positions around the top dead center position which, as already noted, are also indicated by markers 12a and 14. It is to be noted that the detection range of detector 18 and the reflected light from strip 16 are such that detector 18 will have a pulse output that overlaps the precise top dead center position, i.e., occurs over a range including positions corresponding not only to top dead center but also to positions to the left and right of top dead center.

The output A of photo detector 18 is fed to pulse shaper 22 where it is appropriately squared to produce output B. The squared signal is fed to ramp generator 23 which generates a ramp or sawtooth signal C having a duration corresponding to that of the output of the pulse shaper. The output of the ramp generator is fed to peak detector and hold circuit 25 which detects and holds the peak of the ramp signal. This peak signal is fed to potentiometer 27 where a percentage of the peak signal D is selected by adjustment of the arm thereof. Ramp signal C and the percentage signal D from potentiometer 27 are fed to voltage comparator 30 which provides a drive signal to pulse generator 32 when the ramp voltage reaches that to which the potentiometer is set. When this condition occurs, pulse generator 32 generates an output pulse E.

Output pulse E is precisely calibrated so that it accurately represents the top dead center position (or a selected position near TDC) by closing switch 40 to the "calibrate" mode. Under such conditions, the output pulse is used to energize strobe lamp 42, this lamp being placed opposite the markers 12a and 14. When the output pulse E is accurately calibrated with the top dead center position, the markers 12a and 14 will appear in precise alignment under the strobe. Such calibration can be precisely adjusted by means of calibration potentiometer 27 which, as can be seen, with its adjustment changes the time of appearance of the output pulse over the timing range of pulse B and ramp C. Once the calibration has been accurately achieved, the strobe light can be disconnected, the output pulse now accurately indicating the rotational position of interest.

It is to be noted that once calibration has been achieved, the output pulse will continue to accurately indicate the engine position of interest, even with changes of engine speed, this in view of the fact that the output D of potentiometer 27 provides a percentage of the peak ramp voltage which will retain the same relative position in the ramp cycle regardless of rotation speed.

Referring now particularly to FIG. 2, an example of the operation of the invention will be reviewed for illustrative purposes. For this illustrative example, ramp C is shown to have an amplitude running from 0–3 units while potentiometer output D is shown to have an amplitude of 2. In this instance, as can be seen, the leading edge of pulse E is generated when the ramp voltage reaches an amplitude of 2 (corresponding to voltage D). Thus it can be seen that the leading edge of pulse E can be made to occur anywhere within the range of ramp C by appropriately adjusting potentiometer 27.

Figure 3:
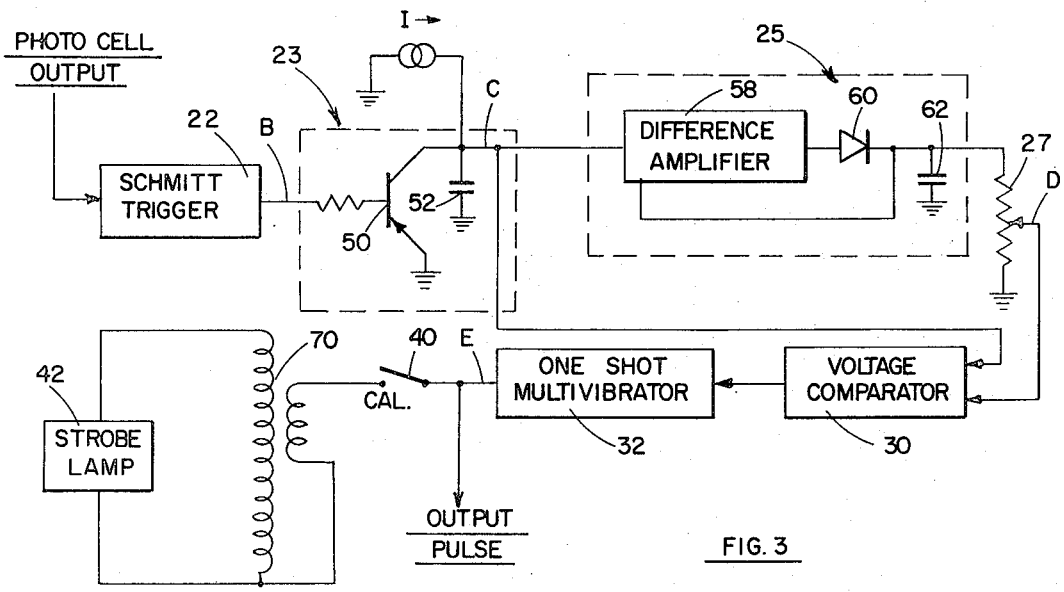
FIG. 3 is a schematic drawing illustrating a specific implementation of the preferred embodiment.

Referring now to FIG. 3, a specific implementation of the preferred embodiment of the invention is schematically illustrated. The pulse output of the photocell is shaped to form a rectangular signal B by means of Schmitt trigger 22. Pulse B is fed to ramp generator 23 which comprises a transistor 50 having a charging capacitor 52 connected between its collector and emitter. Charging current is supplied to capacitor 52 from current source 55. Transistor 50 is normally conducting and is driven to cutoff by pulses B. When transistor 50 is thus driven to cutoff, capacitor 52 charges to produce the ramp signal, this signal going to zero with the trailing edge of pulse B.

The ramp signal C is fed to difference amplifier 58 of peak detector and hold circuit 25. Difference amplifier 58 amplifies the ramp signal and feeds it to diode 60 to provide charging current for capacitor 62. Capacitor 62 charges to the peak of the ramp and holds this peak voltage over successive ramp cycles, the difference amplifier receiving a signal from the capacitor for comparison with the ramp voltage, any difference voltage detected by the amplifier being used to assure that the peak ramp voltage is maintained across the capacitor on successive cycles. The voltage across capacitor 62 is placed across potentiometer 65, a percentage of this voltage D being selected at the arm of the potentiometer. The voltage D at the arm of the potentiometer 65 is fed to voltage comparator 30 for comparison with the ramp signal C, the output of the comparator being utilized to drive one-shot multivibrator 32 to produce the output pulse E. The output pulse is fed through switch 40 to step up transformer 70 which feeds the strobe lamp 42.

It is to be noted that the invention can be implemented with a magnetic marker on crankshaft 11 operating in conjunction with a magnetic detector in lieu of optical marker 16 and photosensor 18 shown in FIG. 1.

It can also be seen that the potentiometer 65 can be calibrated in degrees, knowing the dimensions of marker 16 or using other degree marks on the flywheel housing, thereby providing a means for producing pulses at known intervals other than top dead center.

This invention thus provides a simple yet highly effective means for accurately calibrating a synchronization pulse indicating a predetermined portion of a rotation cycle of a machine such as an engine.

While the invention has been described and illustrated in detail, it is to be clearly understood that this is intended by way of illustration and example only and is not to be taken by way of limitation, the spirit and scope of this invention being limited only by the terms of the following claims.

We claim:

1. In combination, an internal combustion engine having rotating parts and a device for generating a synchronization pulse precisely indicating a predetermined position in the rotation cycle of the rotating parts of said internal combustion engine, said device comprising:

a marker on one of said rotating parts, sensor means responsive to said marker for generating a pulse signal when the rotating parts are in the vicinity of said predetermined position, means responsive to the output of the sensor means for generating a synchronization pulse which occupies a fraction of the time cycle of the pulse output signal of said sensor means, said last mentioned means comprising a ramp generator for generating a ramp signal in response to the output of said sensor means, means for selecting a DC signal which is a percentage of the peak of the ramp signal, and a voltage comparator receiving said ramp signal and the selected DC signal for providing said synchronization pulse at a point on the ramp signal equal to the selected DC signal, visual marker means on said engine indicative of said predetermined position, a strobe lamp for strobing said marker means, the synchronization pulses being used to ignite the strobe lamp, and means for adjusting the timing of said synchronization pulse within the range of the pulse signal output of said sensor means to synchronization with the strobing of the visual marker means, said adjusting means comprising a peak detector and hold circuit for detecting the peak of the ramp signal and holding a voltage corresponding to said peak signal and a potentiometer for selecting a percentage of said peak signal to provide the selected DC signal, the selected DC signal being fed from the potentiometer to the comparator for comparison with the ramp signal.

2. In combination, a machine having a rotor member and a device for generating a pulse precisely indicative of a predetermined position in the rotation cycle of the rotor member of said machine, said device comprising:

marker means on said rotor member, sensor means responsive to said marker means for generating a pulse signal when the rotor member of said machine is in the vicinity of said predetermined position, means for generating a ramp signal in response to said pulse signal, peak detector and hold circuit for detecting the peak of said ramp signal and holding a voltage corresponding to said peak, calibration means for selectively providing a signal which is a percentage of the voltage corresponding to said peak, voltage comparator means for comparing the selected percentage signal with said ramp signal and generating an output when the ramp signal reaches the same value as said percentage signal, means for generating a pulse in response to the output of said voltage comparator means, a strobe lamp, there being visual marker means on said machine indicative of said predetermined position, the output of said pulse generator being fed to said strobe lamp to ignite said lamp in response thereto, whereby said visual marker means on said machine can be stroboscopically made to indicate said predetermined position by adjusting said calibration means, thereby calibrating the output of the pulse generator with the visual marker means on said machine.

3. The device of claim 2 wherein said marker means comprises a reflective tape and said sensor means comprises a photo sensor.

4. The device of claim 2 wherein said calibration means comprises a potentiometer, the arm of said potentiometer being adjusted to provide said percentage signal.

5. The device of claim 2 wherein said machine is an internal combustion engine, said predetermined position comprising the top dead center position of the engine.

* * * * *